United States Patent [19]

Pellegrino

[11] 4,286,742
[45] Sep. 1, 1981

[54] CUP HOLDER

[76] Inventor: Bernard Pellegrino, 100 Adla Dr., Hamden, Conn. 06514

[21] Appl. No.: 125,914

[22] Filed: Feb. 29, 1980

[51] Int. Cl.³ .............................................. A47G 29/00
[52] U.S. Cl. .................................... 224/281; 296/37.9
[58] Field of Search ............... 224/281, 273, 274, 278, 224/148; 220/85 H, 23.8; 296/37.1, 37.8, 37.9, 37.11, 37.12; 248/311.2, 311.3, 315; 211/13, 74; 206/562, 563, 37.9; 229/30

[56] References Cited

U.S. PATENT DOCUMENTS

| | | | |
|---|---|---|---|
| 2,043,886 | 6/1936 | DeBoer | 296/37.9 X |
| 2,771,232 | 11/1956 | Reed | 229/30 X |
| 2,800,360 | 7/1957 | Jenkins | 224/281 X |
| 3,295,669 | 1/1967 | Scheider | 224/281 X |
| 3,904,041 | 9/1975 | Medgebow | 248/315 X |

*Primary Examiner*—Steven M. Pollard
*Attorney, Agent, or Firm*—DeLio and Montgomery

[57] ABSTRACT

A cup holder is disclosed which attaches at the ashtray of an automobile. In one embodiment the cup receiving means of the cup holder is a circular orifice. Some embodiments of the cup holder have removable portions which allow for the shape and size of the cup holder to be adapted to conform to a variety of ashtray and dashboard sizes and configurations.

15 Claims, 5 Drawing Figures

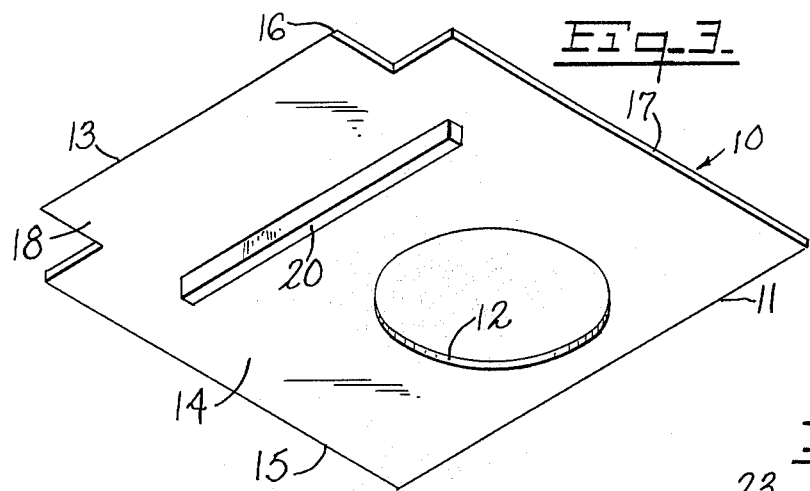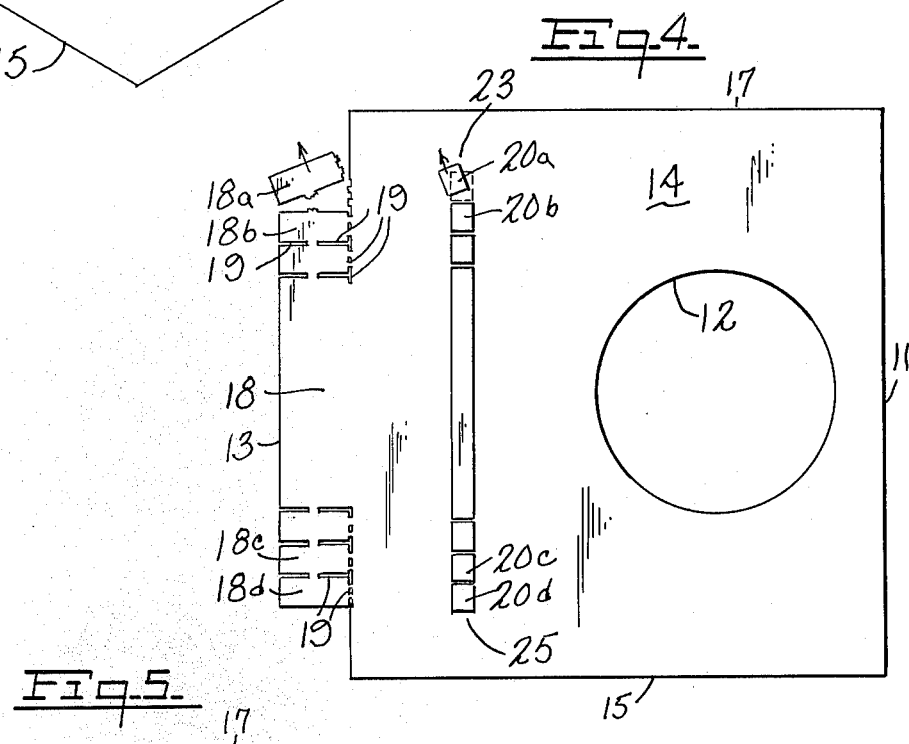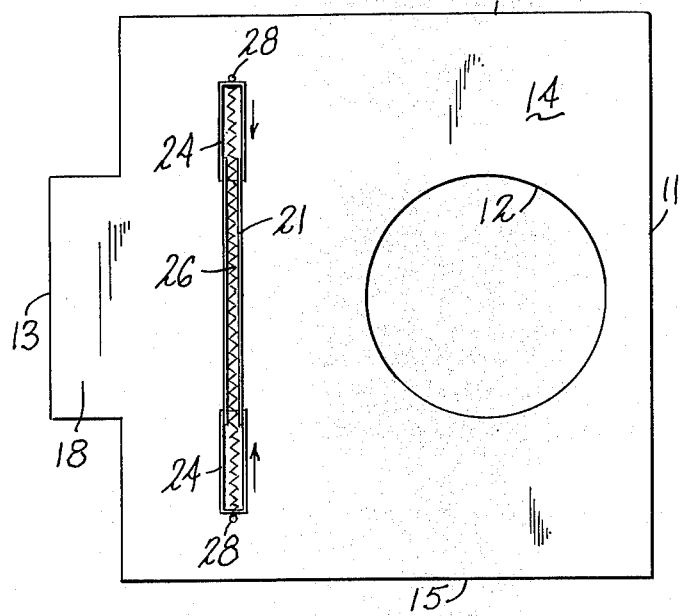

CUP HOLDER

This invention relates to cup holders. More particularly, this invention relates to cup holders adapted to be used in automobiles or other similar vehicles.

A variety of cup holders, trays, bottle holders and other similar devices have been developed for use in automobiles. Many of these prior art devices require mounting frames or the installation of other additional mounting means on the automobile dashboard or console. Consequently, tools are often required to install such holding devices and the additional installation time and expense prevents mass public acceptance.

Prior art holding devices adapted for automobile use have exhibited other deficiencies. Many of the devices are so complex that the unit manufacturing costs are too high, especially in view of the fact that the holding devices are essentially convenience items. Other devices are so structured that the use of the holding device is restricted to specific automobile makes, models and/or configurations.

This invention provides for a new and improved cup holder which is inexpensive to manufacture, easy to install and is adaptable for use in a large number of automobile makes and models.

Briefly stated, this invention in preferred form comprises a substantially rectangular plate containing an orifice adapted to receive a cup. The plate is further structured to facilitate attachment at the ashtray of an automobile or similar vehicle.

Alternate embodiments of the invention provide for a cup holder which is adaptable to a larger variety of ashtray dimensions and configurations, as well as a larger variety of ashtray/dashboard support mechanisms.

An object of this invention is to provide a new and improved cup holder adapted to be attached at the ashtray of an automobile.

An object of this invention is to provide a new and improved cup holder which is adaptable for use in a multiplicity of automobile makes and models.

Another object of this invention is to provide a new and improved cup holder which is easily installed in an automobile and requires no additional tools or mounting parts.

A still further object of this invention is to provide a new and improved cup holder which is compact and relatively inexpensive to manufacture.

The features of the invention which are believed to be novel are particularly pointed out and distinctly claimed in the concluding portion of the specification. The invention, however, both as to its organization and operation, together with further objects and advantages thereof may best be appreciated by reference to the following detailed description, taken in conjunction with the drawings wherein:

FIG. 3 is a bottom view of the cup holder.

FIG. 4 is a bottom view of the cup holder illustrating an alternate embodiment of the invention.

FIG. 5 is a bottom view of still another embodiment of the invention illustrating an adjustable stop mechanism.

Figure 1:
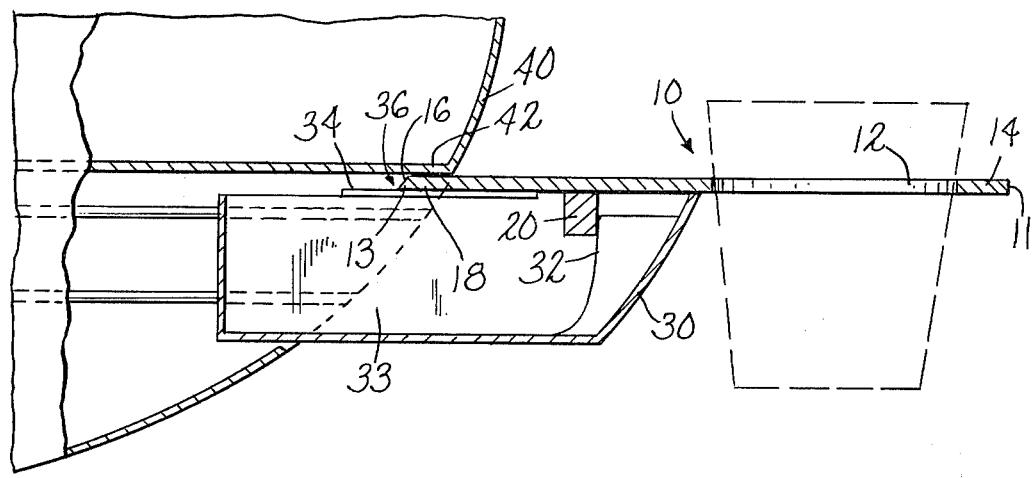
FIG. 1 is a side view partially in section of the invention showing the relationship of the cup holder to the dashboard and ashtray.

The cup holder shown generally at 10 comprises a substantially rectangular plate 14 of plastic, wood, fiber or the like having a rear edge 11, a front edge 13 and sides 15 and 17. The rear portion of the plate is adapted to facilitate the insertion of such portion into the interface 36 between an ashtray 30 and a dashboard 40 as illustrated in FIG. 1. To accomplish the latter, the rear edge 11 of the plate 14 is transversed by a beveled edge 16. Congruent rectangular notches may be formed at each side of the rear edge as shown in the drawings, so as to form a tongue projection 18 adjacent to the beveled edge 16.

Cup receiving means is centrally located between sides 15 and 17 near the front edge 13. The receiving means may take many forms, such as a plurality of openings, etc., but the preferable form is simply a circular orifice 12. The diameter of the orifice 12 is commensurate with the diameter which is of a size approximately midway between the diameter of the base and the top of a standard cup, so that the cup when placed in the orifice will be positioned to be securely held in the cup holder, but with sufficient cup surface above the cup holder to facilitate gripping and withdrawing of the cup from the holder, as shown in FIG. 1.

Figure 2:
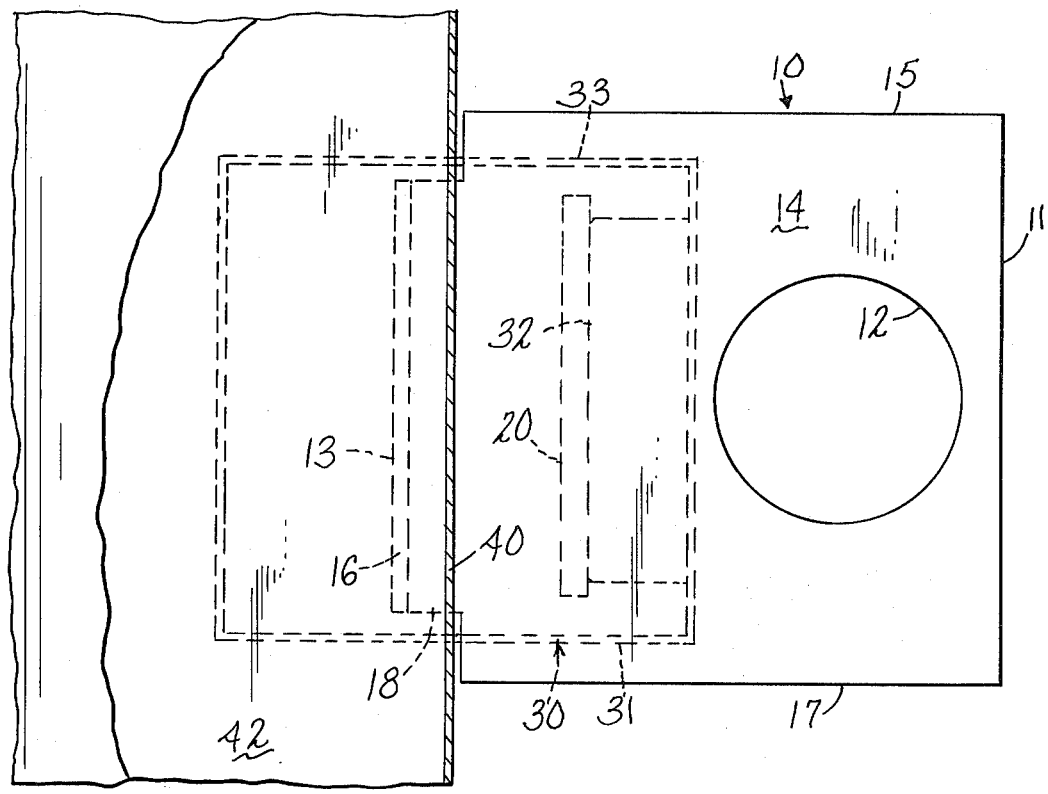
FIG. 2 is a partial top view of the cup holder of FIG. 1.

A stop 20 extending from the bottom surface of the holder is parallel to the rear edge 11 and is positioned between the rear edge 11 and the orifice 12. The stop 20 is adapted to contact against the interior front surface 32 of the ashtray as shown in FIGS. 1 and 2. The longitudinal dimensions of both the stop and the beveled edge are generally less than the inside width of a standard automobile ashtray.

Plate 14 is generally of such uniform thickness that will allow the tongue 18 at the beveled edge 16 to be firmly inserted between the top 34 of an open ashtray and the bottom of the dashboard covering 42 or frame support for the ashtray as shown in FIG. 1. The stability of the cup holder when attached at the ashtray will be reduced somewhat if the plate is too thin. Naturally, a plate which is too thick cannot be inserted between the dashboard and the top of the ashtray. Some degree of resiliency will normally be encountered at the interface 36 between the ashtray top 34 and the dashboard cover 42 upon insertion of the cup holder. In this regard, the insertion is further facilitated by the beveled edge structure 16.

The cup holder is easily mounted at the dashboard/ashtray interface 36 position of the automobile. The ashtray 30 is moved to an open position as illustrated in FIG. 1. The beveled edge 16 is positioned near the interface 36 between the ashtray top 34 and the bottom of the dashboard covering 42, or between the bottom of the ashtray/dashboard support frame and the top of the ashtray covering surface, depending upon the particular ashtray/dashboard assembly. The tongue 18 is inserted into the interface 36, so that the front of the stop 20 is positioned firmly against the interior front surface 32 which may be in the form of a lip, while a firm engagement of the tongue is maintained at the ashtray/dashboard interface 36. The open position of the ashtray may be altered to position the stop 20 against the interior front lip 32 of the ashtray so as to maintain the tongue-interface engagement. The cup holder is now securely mounted and is ready for use.

It can be seen that the installed cup holder is supported by the rear portion resting on the top of the open ashtray 30 as shown in FIG. 1. The tongue 18 adjacent the rear edge engages between the ashtray top 34 and dashboard covering 42 so as to prevent tipping of the cup holder when downward forces, such as forces resulting from positioning a cup in the orifice, are exerted on the cup holder in the vicinity of the front edge 13. The stop 20 functions to prevent the holder from pulling away from the ashtray/dashboard assembly and subsequently tipping or detaching.

The stability of the cup holder is enhanced if the front edge longitudinal dimension is slightly greater than the corresponding dimension of the beveled edge portion. The stability of the attached cup holder is similarly strengthened if the side dimensions are generally equal to or less than the front longitudinal dimension.

A second embodiment of the cup holder facilitates the adaptability of the cup holder to a larger variety of ashtray/dashboard configurations by means of providing for the easy removability of sections of the plate shown in FIG. 4 as 18(a), 18(b), 18(c) and 18(d). The latter sections are removed to allow for the dimensions of the tongue and beveled edge to more closely conform to the interface dimensions of a given automobile make or model. These latter removable sections are substantially rectangular and are adjacent to the beveled edge.

A series of perforations shown generally as 19 define the sections. The perforations 19 extend from the top to the bottom surface of the plate. Other means to facilitate easy removability of sections, such as grooves or indentations may be employed. However, the sections and removing means are structured so that the strength and stability of the cup holder are not substantially affected by the presence of the perforations or other removing means, while at the same time the perforations allow for the removal of sections of the plate 18(a), 18(b), etc., by manual means with a minimal amount of required force.

The stop may also have removable segments 20(a), 20(b), 20(c), etc., as shown in FIG. 4. The substantially rectilinear removable stop segments are located at the ends 23 and 25 of the stop. The stop segments 20(a), 20(b), 20(c), etc., may be defined by means of a perforation, indentation or series of perforations and indentations in a manner similar to the removing means of the removable portions 18(a), 18(b), etc. It is noted that stop 20 may be attached to plate 14 at a central stop location, while the portions 20(a), 20(b), etc., are not directly attached to plate 14. This further allows for a relatively easy removal of the segments 20(a), 20(b), etc.

It should be noted that a multiplicity of removable sections of the plate and removable segments of the stop are possible. The number of removable elements as shown in FIG. 4 is for illustrative purposes only. Elements 18(a), 18(b), 18(c), etc., and 20(a), 20(b), 20(c), etc., are removed to easily adapt the cup holder to specific dimensions and configurations of a given ashtray and ashtray/dashboard assembly. Naturally, the characteristics of each automobile will determine which, if any, of the elements should be removed. It can thus be seen that a single cup holder can be manufactured which will be suitable for use in a large variety of automobile makes and models.

Another embodiment of a stop in the form of an adjustable stop mechanism is illustrated in FIG. 5. This embodiment provides for a firm engagement of the stop against the interior sides 31 and 33 of the ashtray. A spring 26 is retained in a stop housing 21 extending from the bottom of the plate 14. Side guides 24 are connected in a tongue and groove or similar-type sliding engagement with the stop housing 21. The outwardly biased spring 26 contacts at each end the side guides 24, and acts to force the guides 24 towards sides 15 and 17. The engagement with the stop housing 21 acts to vertically secure the side guides 24 to the plate 14. Horizontal securing means, which may be in the form of shallow pins 28, extend from the bottom of the plate. By preventing the side guides from sliding beyond the pins, the pins 28 act to define the maximum longitudinal dimension of the adjustable stop.

The adjustable stop mechanism is thus adjustable to fit firmly against the interior sides of any ashtray having an interior width less than or equal to the maximum longitudinal dimension of the stop. Installation of a cup holder embodying the adjustable stop is accomplished by compressing the side guides 24 toward each other as shown in the arrows of FIG. 5 and inserting the stop into the ashtray in the manner described previously. Upon release of the force compressing the side guides, the spring will act to force the side guides 24 against the interior sides 31 and 33 of the ashtray. The adjustable stop thus provides not only a firmer ashtray engagement, but a stop mechanism which will conform to fit a multiplicity of ashtray sizes.

It may thus be seen that the objects of the invention set forth above, as well as those made apparent, have been efficiently attained.

While preferred embodiments of the invention have been set forth for purposes of disclosure, other embodiments and modifications of the disclosed embodiment of the invention may be derived by others skilled in the art. Accordingly, the appended claims are intended to cover all embodiments and applications of the invention and reversals thereof which do not depart from the spirit and scope of the invention.

What is claimed is:

1. A cup holder adapted to be attached at an ashtray of an automobile comprising:
    (a) a plate having front and rear edges, two opposing sides, and a top and bottom surface;
    (b) a cup receiving means located between the sides; and
    (c) a stop having two opposing ends and extending from at least one surface and being substantially parallel to at least one of said edges, said stop adapted to be positioned against an interior portion of the automobile ashtray.

2. The cup holder of claim 1 wherein the rear edge comprises a beveled edge.

3. The cup holder of claim 1 wherein the cup receiving means comprises a circular orifice.

4. The cup holder of claim 1 wherein the cup receiving means comprises a plurality of orifices.

5. The cup holder of claim 1 wherein the plate is substantially rectangular.

6. The cup holder of claim 1 wherein a portion of the plate adjacent the rear edge is in the form of a tongue.

7. The cup holder of claim 1 wherein a portion of the plate adjacent the rear edge comprises a multiplicity of removable sections.

8. The cup holder of claim 7 wherein the removable sections are substantially rectangular and are defined by a multiplicity of perforations extending from the top surface to the bottom surface.

9. The cup holder of claim 1 wherein the ends of the stop comprise removable segments.

10. The cup holder of claim 1 wherein the stop further comprises:
    (a) a housing having two ends;

(b) side guides slidably engaged at each end of the housing;

(c) resilient means retained in the housing and acting to force the side guides away from the ends of the housing; and (d) means limiting movement of the side guides from the ends.

11. The cup holder of claim 10 wherein the limiting means are shallow pins extending from the bottom of the plate.

12. In combination,
an automobile ashtray,
a cup holder slidably received in said ashtray, said cup holder comprising:

(a) a plate having front and rear edges, two opposing sides and a top and bottom surface;

(b) a cup receiving means located between the sides; and (c) a stop extending from the bottom surface and being substantially parallel to at least one of said edges, said stop positioned against an interior portion of said ashtray.

13. The combination of claim 12 wherein the cup receiving means comprises a circular orifice.

14. The combination of claim 12 wherein the cup receiving means comprises a plurality of orifices.

15. The combination of claim 12 wherein the stop further comprises two opposing ends, each of said ends being positioned against said ashtray.

* * * * *